United States Patent
Li (10) Patent No.: US 7,844,593 B2
(45) Date of Patent: Nov. 30, 2010

(54) METHOD AND SYSTEM FOR NETWORK SEARCH

(75) Inventor: Qiang Li, Shenzhen (CN)

(73) Assignee: Tecent Technology (Shenzhen) Company Limited, Shenzhen (CN)

(*) Notice: Subject to any disclaimer, the term of this patent is extended or adjusted under 35 U.S.C. 154(b) by 401 days.

(21) Appl. No.: 12/050,716

(22) Filed: Mar. 18, 2008

(65) Prior Publication Data

US 2008/0162408 A1 Jul. 3, 2008

Related U.S. Application Data

(63) Continuation of application No. PCT/CN2006/002490, filed on Sep. 22, 2006.

(30) Foreign Application Priority Data

Sep. 23, 2005 (CN) .................... 2005 1 0106006

(51) Int. Cl.
 *G06F 17/30* (2006.01)
 *G06F 17/00* (2006.01)
(52) U.S. Cl. ..................... 707/707; 707/735
(58) Field of Classification Search .......... 707/999.001–999.007; 709/224
 See application file for complete search history.

(56) References Cited

U.S. PATENT DOCUMENTS 6,636,854 B2 * 10/2003 Dutta et al. ............... 1/1
7,730,178 B2 * 6/2010 Labio et al. ............... 709/224

FOREIGN PATENT DOCUMENTS

| JP | 2000207406 A | 7/2000 |
| JP | 2001216232 A | 8/2001 |
| JP | 2004151855 A | 5/2004 |
| JP | 2004310542 A | 11/2004 |

OTHER PUBLICATIONS

International Search Report for International Application No. PCT/CN2006/002490, dated Feb. 1, 2007, and English translation thereof.

* cited by examiner

*Primary Examiner*—Yicun Wu (57) ABSTRACT

The present invention provides a network search system, including: a search initiating client, configured to initiate a search request to a resource search server, and acquire network resource according to a resource feature information index returned by a resource search server; the resource search server, configured to acquire a search response client corresponding to the search initiating client according to a corresponding relation between the search response client and the search initiating client, search a resource index server corresponding to the search response client according to the search request, and return the resource feature information index to the search initiating client; the resource index server, configured to store the resource feature information index reported by the search response client. A network search method is also disclosed. By use of the present invention, it is possible to improve the instant performance of network search and the individuation of the search result.

12 Claims, 5 Drawing Sheets

METHOD AND SYSTEM FOR NETWORK SEARCH

CROSS-REFERENCE TO RELATED APPLICATIONS

This application is a continuation of International Application No. PCT/CN2006/002490, filed Sep. 22, 2006. This application claims the benefit of Chinese Patent Applicant No. 200510106006.8 filed Sep. 23, 2005. The disclosures of the above applications are incorporated herein by reference.

FIELD

The present disclosure relates to search engine technologies, and to a method and a system for network search.

BACKGROUND

The statements in this section merely provide background information related to the present disclosure and may not constitute prior art.

In recent years, network search engine technologies have been improved increasingly, and there are three generation search engines by far. The $1^{st}$ generation search engine performs search by use of the classifying directory made manually; the $2^{nd}$ generation search engine performs search by machine grabbing, which is a web page search method based on hyperlink analysis; the $3^{rd}$ generation search engine performs search according to interaction prompts between a computer and a user. The current search engine mainly performs web page search from web pages on the Internet and files associated with the web pages.

Figure 1:
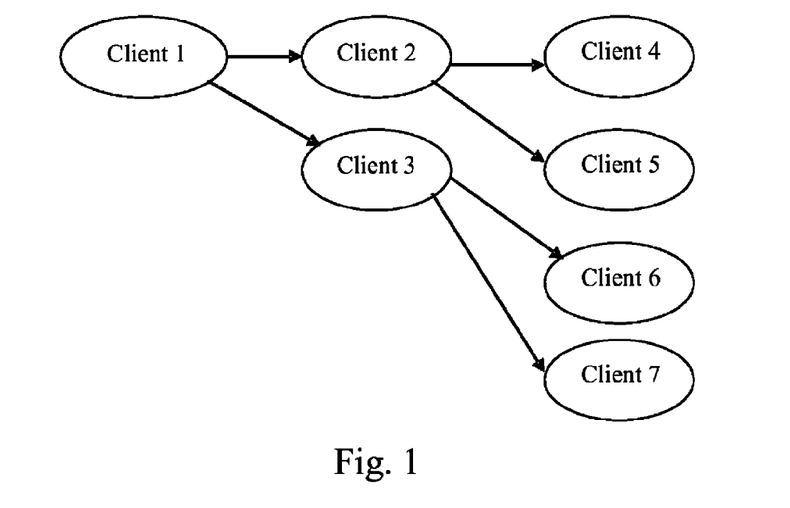
FIG. 1 is a schematic diagram illustrating a p2p-based network search technology in the prior art.
Figure 2:
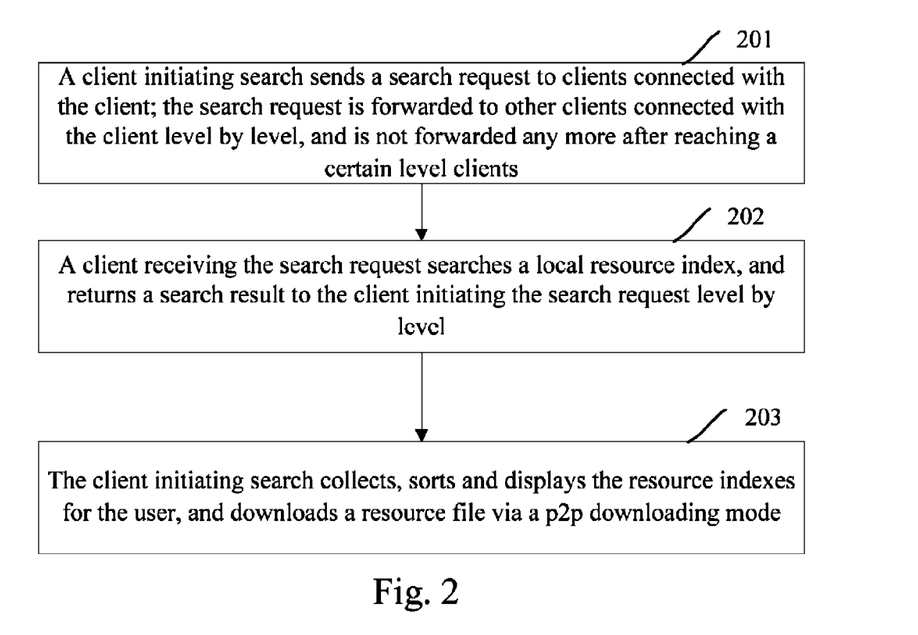
FIG. 2 is a flowchart illustrating a p2p-based network search method in the prior art.

At present, there is a p2p-based network search method in the prior art. FIG. 1 is a schematic diagram illustrating the p2p-based network search technology in the prior art. In FIG. 1, Client 1 is a search initiator and Clients 2 and 3 are the first level clients responding to the search initiated by Client 1; Clients 4 and 5 are connected to Client 2, and Clients 6 and 7 are connected to Client 3; Clients 4, 5, 6 and 7 are the second level clients responding to the search. FIG. 2 is a flowchart illustrating the p2p-based network search method in the prior art. As shown in FIG. 2, the method includes processes as follows.

201: A client initiating search sends a search request to clients connected with the client; the search request is forwarded to other clients connected with the client level by level, and the search request is not forwarded any more after reaching a certain level clients.

For example, Client 1 sends a search request to Clients 2 and 3; Client 2 forwards the search request to Clients 4 and 5, and Client 3 forwards the search request to Clients 6 and 7.

202: A client receiving the search request searches for a local resource index, and returns a search result to the client initiating the search request level by level.

For example, Clients 2, 3, 4, 5, 6 and 7 respectively search for local resource indices, and respectively return the resource indices which are searched out to Client 1 level by level.

203: The client initiating search collects, sorts and displays the resource indices for the user, and downloads a resource file via a p2p downloading mode.

For example, after receiving the resource indices returned by clients responding to the search request, Client 1 collects, sorts and displays the resource indices, and downloads a resource file selected by the user according to the resource index via the p2p downloading mode; the resource file is downloaded from a client corresponding to the resource file.

In this p2p-based network search method, since the search request sent by the client initiating search needs to be forwarded to various clients level by level, it will take a long time for the search request to reach clients in various levels; similarly, it also takes a long time for the search results of clients in various levels to be reported to the client initiating search level by level. As a result, the response speed of the p2p-based network search technology is very slow, which is unable to meet the instant requirement of network search.

SUMMARY

A system for network search so as to improve the response speed of network search, thereby meeting the instant requirement of network search.

The embodiments of the present invention provide a method for network search, so as to improve the response speed of network search, thereby meeting the instant requirement of network search.

A system for network search includes:

a search initiating client, configured to initiate a search request to a resource search server, and acquire network resource according to a resource feature information index returned by a resource search server;

the resource search server, configured to acquire a search response client corresponding to the search initiating client according to a corresponding relation between the search initiating client and the search response client, search a resource index server corresponding to the search response client according to the search request, and return the resource feature information index to the search initiating client;

the resource index server, configured to store the resource feature information index reported by the search response client.

A method for network search includes:

initiating, by the search initiating client, a search request to a resource search server;

acquiring, by the resource search server, a search response client corresponding to the search initiating client according to a corresponding relation between the search initiating client and the search response client, searching a resource index server for storing a resource feature information index according to the search request, and returning the resource feature information index to the search initiating client;

acquiring, by the search initiating client, network resource according to the resource feature information index returned by the resource search server.

As can be seen, before the search initiating client sends a search request to the resource search server, the search response client has reported the resource feature information index of the local resource to the resource index server; in this way, the search initiating client may search for desired network resource information index directly from the resource index server without searching for the network resource information index from various search response clients, and it is needless to forward the search request to various search response clients level by level. Therefore, it is possible to improve the response speed of network search, thereby meeting the instant requirement of network search.

Moreover, in the present invention, there is a corresponding relation between the search initiating client and the search response client; the search initiating client corresponds to search response clients of multiple levels, there is a corresponding relation between levels. Therefore, a search initiating client may initiate search to a definite object instead of planless search. As a result, the present invention may improve the correctness and individuation of network search.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In order to make the object and technical solution of the present invention clearer, a detailed description of the present invention is hereinafter given with reference to the accompanying drawings and embodiments.

Figure 3:
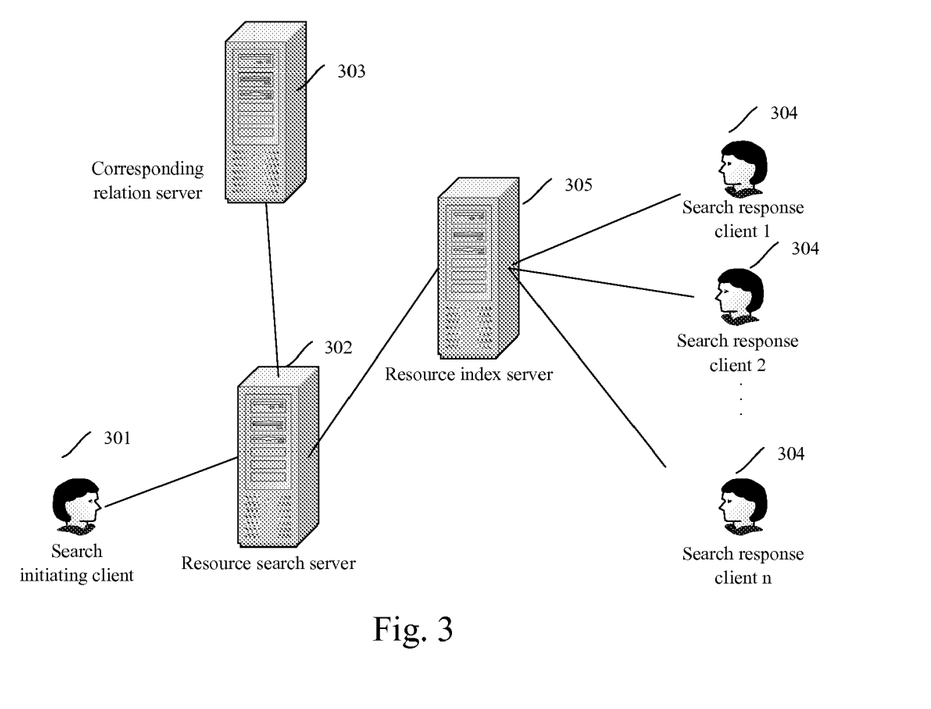
FIG. 3 is a schematic diagram illustrating the structure of a network search system in accordance with an embodiment of the present invention.

FIG. 3 is a schematic diagram illustrating the structure of a network search system in accordance with an embodiment of the present invention. The system as shown in FIG. 3 includes: a search initiating client 301 is used for initiating a search request to a resource search server 302, and acquiring network resource according to a resource feature information index returned by the resource search server 302; the resource search server 302 is used for acquiring a search response client 304 corresponding to the search initiating client 301 from a corresponding relation server 303, searching a resource index server 305 according to the search request, and returning the resource feature information index which is searched out to the search initiating client 301; the search response client 304 is used for reporting the resource feature information index of local resource to the resource index server 305; the resource index server 305 is used for storing the resource feature information index reported by the search response client 304; the corresponding relation server 303 is used for providing the search response client 304 corresponding to the search initiating client 301 to the resource search server 302; the search initiating client 301 is connected to the resource search server 302; the resource search server 302 is connected to the resource index server 305 and the corresponding relation server 303 respectively; the resource index server 305 is further connected to the search response client 304.

In general, the search initiating client 301 may be an instant messaging client in an instant messaging system or an individual network search initiator.

In addition, the search response client 304 may also be an instant messaging client in an instant messaging system and may be a clients group having a certain corresponding relation with the search initiating client 301. The corresponding relation includes but is not limited to: a friend relation, a college relation, a stranger relation and a family relation. The search response client 304 may also be an individual network search response client.

The search response client 304 has a corresponding relation with the search initiating client 301, which guarantees the correctness and individuation of search results. For example, if both a search initiating client 301 and a search response client 304 are teachers, the search initiating client 301 and the search response client 304 have a colleague relation; when the search initiating client 301 needs to search teaching materials, it is possible to acquire these teaching materials from the search response client 304 having a colleague relation with the search initiating client 301, so as to implement the search individuation and improve the possibility of successful search, thereby guaranteeing the correctness of search results. The matching of the corresponding relation may be implemented by an instant messaging system and the corresponding relation may be stored in an instant messaging server. The matching and storage of the corresponding relation is obvious to the skilled in the prior art.

The search response client 304 needs to provide the resource feature information index of the local resource to the resource index server 305. The search response client 304 may send the feature information index of the local resource to the resource index server 305 periodically or send the resource feature information index of newly-generated local network resource to the resource index server 305 when the search response client 304 generates new local network resource. When the search initiating client 301 initiates a search request to the resource search server 302, the resource search server 302 acquires the search response client 304 corresponding to the search initiating client 301 from the corresponding relation server 303, searches for the resource feature information index of the search response client 304 corresponding to the search initiating client 301 in the resource index server 305, and returns the resource feature information index which is searched out to the search initiating client 301. In this way, the search initiating client 301 may acquire the network resource according to the resource feature information index returned by the resource search server 302.

The resource feature information index indicates the method for acquiring network resource. For example, the resource feature information index may include an IP address and port number of the network resource; therefore, the search initiating client 301 may acquire the corresponding network resource via the IP address and port number.

Alternatively, when the search initiating client and the search response client are instant messaging based clients, the corresponding relation server 303 may be an instant messaging server, and the resource feature information index may include the ID number of an instant messaging client having the network resource; therefore, the search initiating client 301 may acquire, according to the ID number, the network resource via a file transmitting channel provided by the instant messaging server.

When there are many search response clients, it is necessary to provide multiple resource index servers, so as to adequately store resource feature information and improve the search speed.

Figure 4:
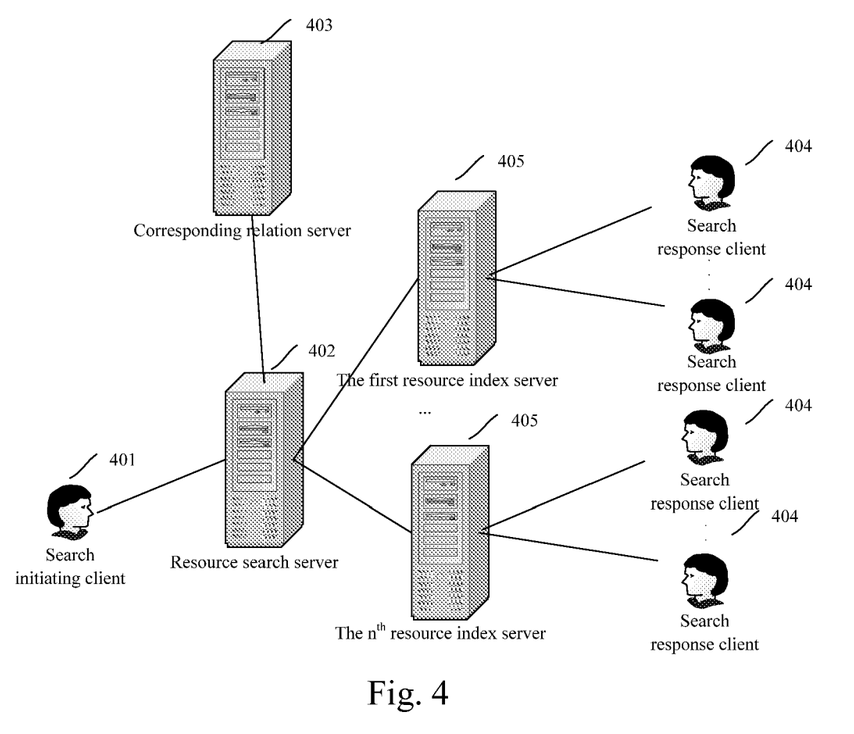
FIG. 4 is a schematic diagram illustrating the structure of a network search system in accordance with another embodiment of the present invention.

FIG. 4 is a schematic diagram illustrating the structure of a network search system in accordance with another embodiment of the present invention. The system as shown in FIG. 4 includes: a search initiating client 401 is used for initiating a search request to a resource search server 402, and acquiring network resource according to a resource feature information index returned by the resource search server 402; the resource search server 402 is used for acquiring a search response client 403 corresponding to the search initiating client 401 from the corresponding relation server 404, searching multiple resource index servers 405 according to the search request, and returning the resource feature information index which is searched out to the search initiating client 401; the search response client 404 is used for reporting the resource feature information index of local resource to the resource index server 405 corresponding to the search response client 404; the resource index server 405 is used for storing the resource feature information index reported by the search response client 404 corresponding to the resource index server 405; the corresponding relation server 403 is used for providing the search response client 404 corresponding to the search initiating client 401 to the resource search server 402. The search initiating client 401 is connected to the resource search server 402; the resource search server 402 is connected to various resource index servers 405; each resource index server is connected to the search response client 404 corresponding to resource index server; the corresponding relation server 403 is further connected to the resource search server 402.

When the search initiating client 401 and the search response client 404 are instant messaging clients, the corresponding relation server 403 may be an instant messaging server; the corresponding relation may be modified in the instant messaging server. The establishment and modification of the corresponding relation is obvious to the skilled in field of the instant messaging technology.

Herein, a resource index server may be allocated to a search response client according to the geographic location of the search response client. For example, the same resource index server is allocated to the search response clients with adjacent IP addresses, or the same resource index server is allocated to the search response clients with adjacent geographic locations, or the same resource index server is allocated to the search response clients with IDs in the same zone. Alternatively, a resource index server may also be allocated to a search response client according to the attribute of the search response client. For example, a resource index server may be allocated to a search response client according to an occupation relation, a friend relation, a family relation and a geographic relation. For example, a specific resource index server may be allocated to all search response clients who are teachers or workers.

The above example for allocating a resource index server to a search response client is not used for limiting the present invention obviously.

When there are many search initiating clients, multiple resource search servers should be provided to guarantee the search speed. A resource search server may be allocated to a search response client according to the geographic location of the search initiating client. For example, the same resource search server is allocated to the search initiating clients with adjacent IP addresses, or the same resource index server is allocated to the search response clients with adjacent geographic locations, or the same resource search server is allocated to the search initiating client with IDs in the same zone. Alternatively, a resource search server may also be allocated to a search initiating client according to the attribute of the search initiating client. For example, a resource search server may be allocated to the search initiating client according to an occupation relation, a friend relation, a family relation and a geographic relation. For example, a specific resource index server may be allocated to all search initiating clients who are teachers or workers.

The above example for allocating a resource search server to a search initiating client is not used for limiting the present invention obviously.

The search initiating client corresponds to search response clients of multiple levels and there is a corresponding relation between levels.

Figure 5:
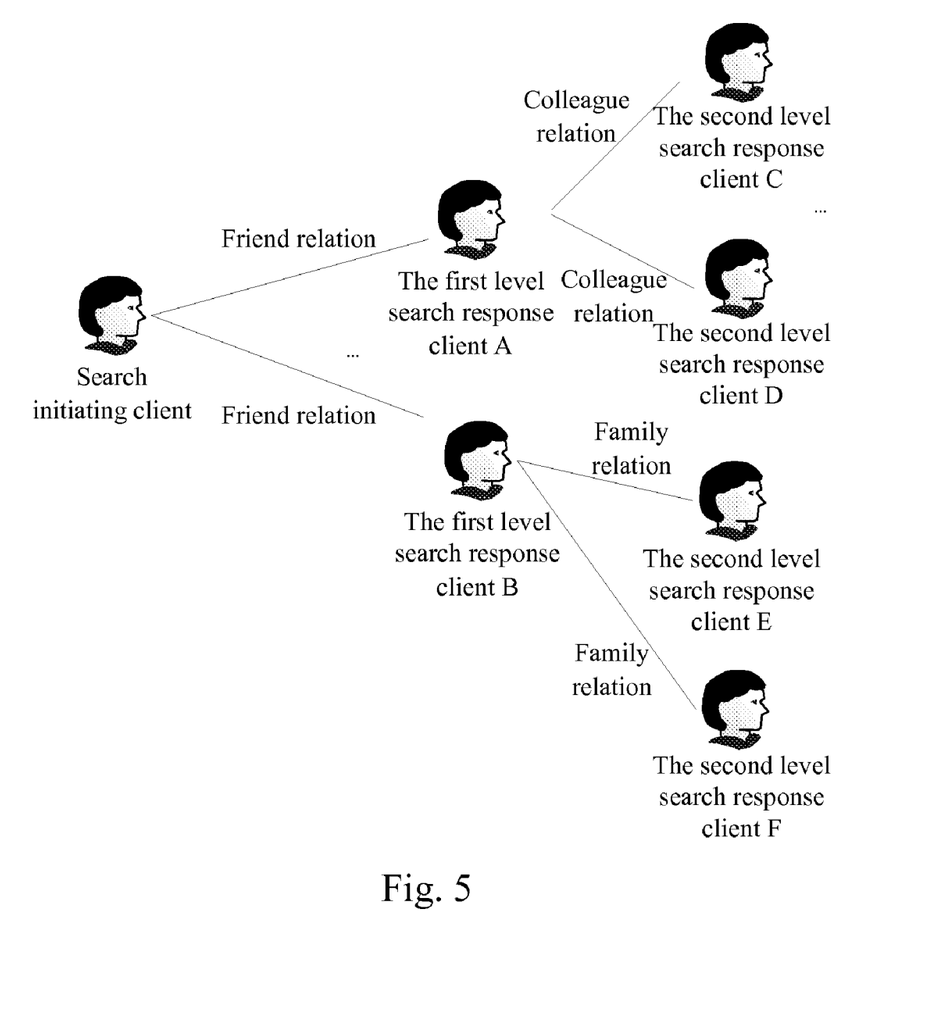
FIG. 5 is a schematic diagram illustrating search response clients of multiple levels in accordance with an embodiment of the present invention.

FIG. 5 is a schematic diagram illustrating search response clients of multiple levels in accordance with an embodiment of the present invention. The corresponding relation between the search initiating client and the first level search response client is a friend relation; the first level search response client includes First level search response clients A and B; First level search response client A may be further connected to Second level search response clients C and D and First level search response client B may be further connected to Second level search response clients E and F. The corresponding relation between Second level search response clients C and D and First level search response client A is a colleague relation while the corresponding relation between Second level search response clients E and F and First level search response client B is a family relation.

The above-mentioned search initiating client corresponds to two level search response clients; however, the level number of the search response clients is not limited in the present invention. Obviously, the bigger the level number is, the wider the network that may be searched is, and the higher the possibility of acquiring the network resource is. Likewise, the corresponding relation between search response clients of various levels is not limited in the present invention.

Figure 6:
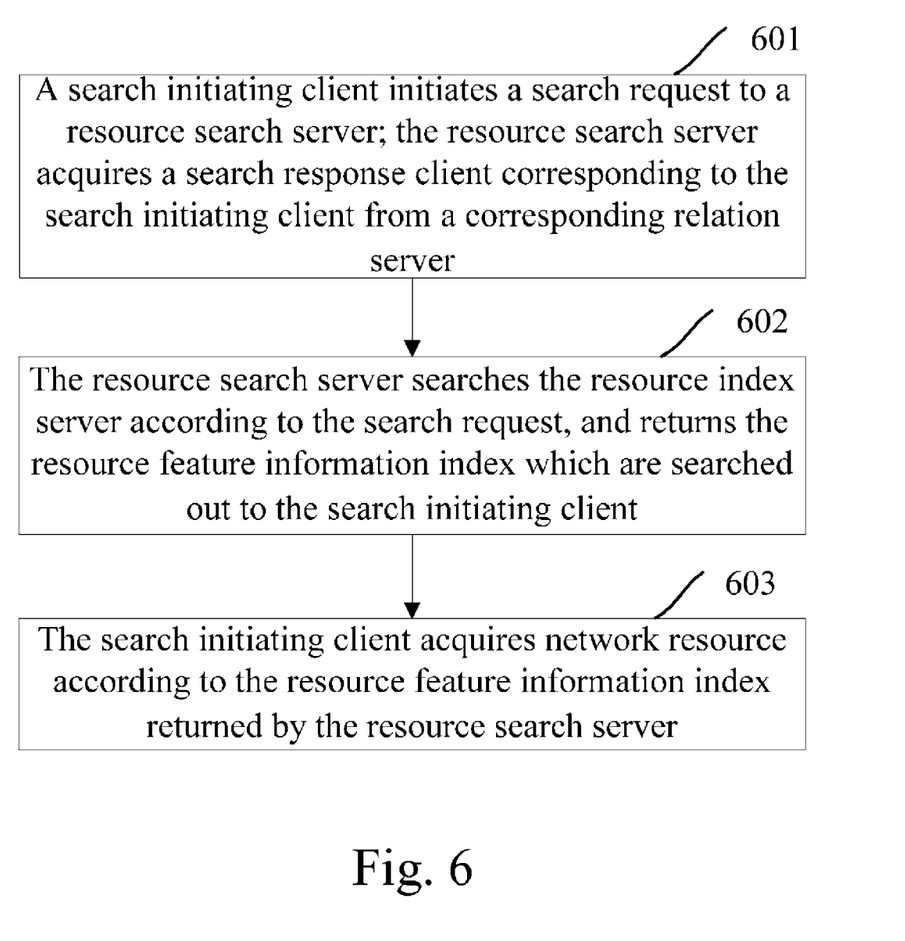
FIG. 6 is a flowchart illustrating a network search method in accordance with an embodiment of the present invention.

FIG. 6 is a flowchart illustrating a method for network search in accordance with an embodiment of the present invention. In this method, the corresponding relation between a search initiating client and a search response client is preset and the search response client sends the feature information index of local resource to the resource index server. As shown in FIG. 6, the method includes the processes as follows.

Block 601: A search initiating client initiates a search request to a resource search server; the resource search server acquires a search response client corresponding to the search initiating client from a corresponding relation server.

For example, there are at least two resource index servers and at least two resource search servers, which may meet the search requirement in the case that there are many search initiating clients and search response clients. Moreover, a resource search server may be allocated to a search initiating client according to the geographic location or the attribute of the search initiating client. Likewise, a resource index server may be allocated a search response client according to the geographic location or the attribute of the search response client.

Block 602: The resource search server searches the resource index server according to the search request, and returns the resource feature information index which is searched out to the search initiating client.

For example, the resource search server searches the resource index server according to the search request to find resource feature information corresponding to the search request. In general, the keyword search method may be used. In addition, the search initiating client corresponds to search response clients of multiple levels, and there is a corresponding relation between various levels. The corresponding relation may include at least one of a friend relation, a colleague relation, a stranger relation and a family relation.

Block 603: The search initiating client acquires network resource according to the resource feature information index returned by the resource search server.

Herein, the resource feature information index acquired by the search initiating client indicates the method for acquiring network resource. For example, the resource feature information index may include an IP address and port number of the network resource, so that the search initiating client may directly acquire the network resource according to the IP address and port number.

In addition, when the search initiating client and the search response client are instant messaging clients, the corresponding relation server may be an instant messaging server; the resource feature information index may further include the ID of an instant messaging client having the network resource; therefore, the search initiating client may acquire the network resource according to the ID via a file transmitting channel provided by the instant messaging server.

In the above processes, the corresponding relation between the search initiating client and the search response client may include at least one of a friend relation, a colleague relation, a stranger relation and a family relation.

In addition, the method for the search response client sending the feature information index of the local resource to the resource index server may include: the search response client sends the resource feature information index of local resource to the resource index server periodically; alternatively, the search response client sends the resource feature information index of newly-generated network resource to the resource index server when the search response client generates the new local network resource.

The foregoing description is only preferred embodiments of the present invention and is not for use in limiting the protection scope thereof. Any modification, equivalent replacement and improvement made under the spirit and principle of the present invention should be included in the protection scope thereof.

What is claimed is:

1. A system for network search, comprising:
    a search initiating client, configured to initiate a search request to a resource search server, and acquire network resources according to a resource feature information index returned by the resource search server;
    the resource search server, configured to acquire at least one search response client corresponding to the search initiating client from a corresponding relation server, search a resource index server corresponding to the at least one search response client according to the search request, and return the resource feature information index to the search initiating client;
    at least one search response client, configured to report the resource feature information index of local resources to the resource index server periodically or report the resource feature information index of newly-generated local network resources to the resource index server when the at least one search response client generates new local network resources;
    the resource index server, configured to store the resource feature information index reported by the at least one search response client;
    the corresponding relation server, configured to provide the at least one search response client corresponding to the search initiating client to the resource search server.

2. The system of claim 1, wherein there are at least two resource index servers; each resource index server is connected to the at least one search response client corresponding to the resource index server.

3. The system of claim 1, wherein the search initiating client is an instant messaging client; the corresponding relation server is an instant messaging server; the at least one search response client is an instant messaging client.

4. The system of claim 1, wherein there are at least two resource search servers; each resource search server is connected to the search initiating client corresponding to the resource search server.

5. The system of claim 1, wherein the search initiating client corresponds to search response clients of multiple levels, and there is a corresponding relation between the multiple levels.

6. A method for network search, comprising:
    reporting, by at least one search response client, resource feature information index of local resources to a resource index server periodically or reporting resource feature information index of newly-generated local network resources to the resource index server when the at least one search response client generates new local network resources;
    initiating, by a search initiating client, a search request to a resource search server;
    acquiring, by the resource search server, the at least one search response client corresponding to the search initiating client from a corresponding relation server, searching the resource index server for storing the resource feature information index according to the search request, and returning the resource feature information index to the search initiating client; and
    acquiring, by the search initiating client, network resources according to the resource feature information index returned by the resource search server.

7. The method of claim 6, wherein the search initiating client corresponds to search response clients of multiple levels, and there is a corresponding relation between the multiple levels.

8. The method of claim 6, wherein there are at least two resource index servers;
    the method further comprising:
    allocating the resource index server corresponding to the at least one search response client according to geographic location of the at least one search response client;
    reporting the resource feature information index comprises:
    reporting the resource feature information index to the resource index server corresponding to the search response client.

9. The method of claim 6, wherein there are at least two resource search servers,
    the method further comprising:
    allocating the resource search server corresponding to the search initiating client to the search initiating client according to geographic location of the search initiating client;
    wherein initiating the search request to the resource search server comprises:
    initiating the search request to the resource search server corresponding to the search initiating client.

10. The method of claim 6, wherein the resource feature information index comprises an IP address and a port number of network resources;

acquiring the network resources according to the resource feature information index returned by the resource search server comprises:

acquiring the network resources according to the IP address and the port number of the network resources.

11. The method of claim 6, wherein the resource feature information index comprises an ID of the search response client having network resources;

acquiring the network resources according to the resource feature information index returned by the resource search server comprises:

acquiring the network resources from the search response client corresponding to the ID via a file transmitting channel provided by the corresponding relation server.

12. The method of claim 6, wherein the search initiating client is an instant messaging client; the corresponding relation server is an instant messaging server; the search response client is an instant messaging client.

\* \* \* \* \*